UNITED STATES PATENT OFFICE.

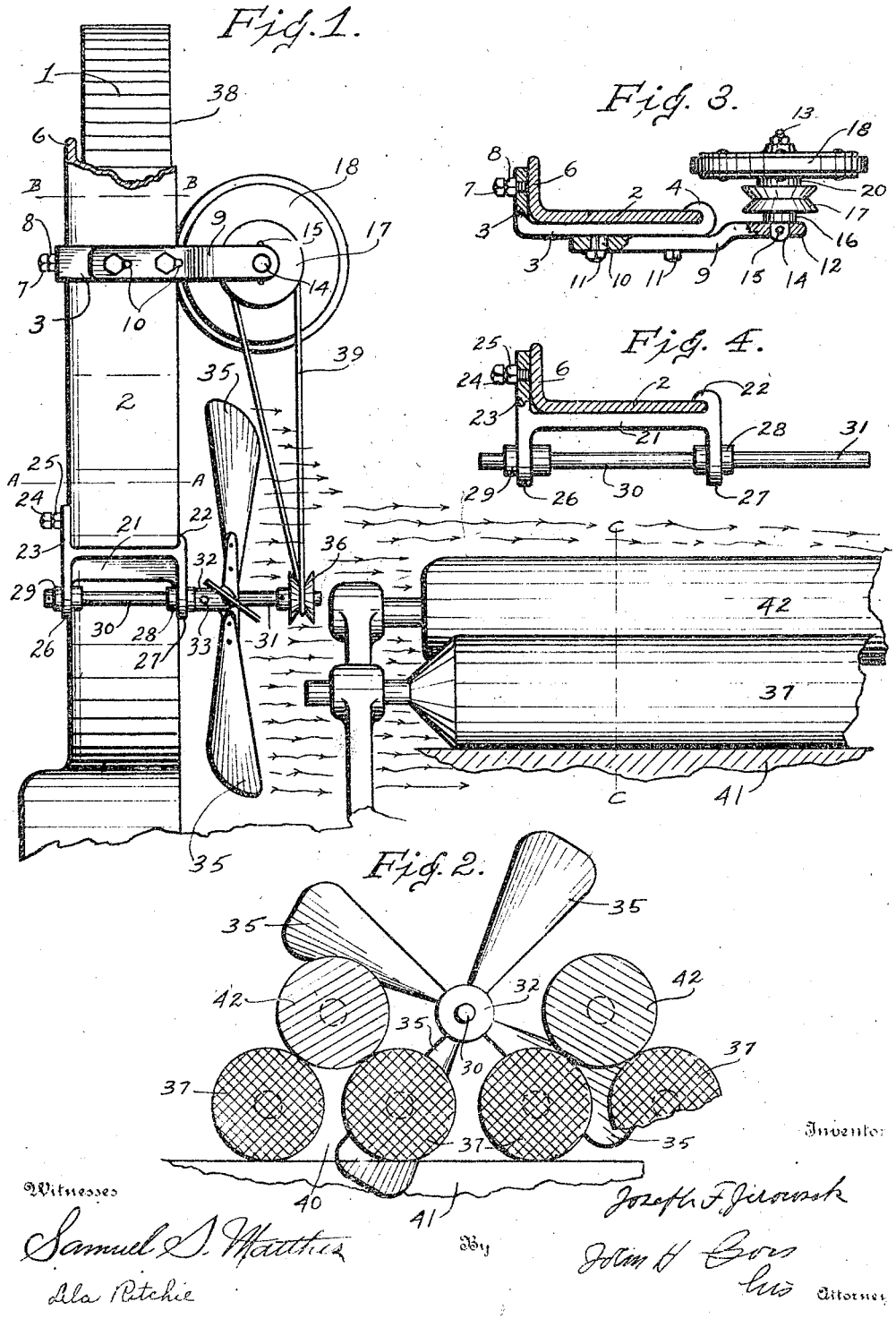

JOSEPH F. JIROUSEK, OF CLEVELAND, OHIO, ASSIGNOR OF ONE-HALF TO B. F. CORDAY, OF CLEVELAND, OHIO.

COOLING AND AIR-CIRCULATING MEANS FOR PRINTING-PRESS INKING-ROLLS.

1,134,744.      Specification of Letters Patent.      Patented Apr. 6, 1915.

Application filed August 10, 1914. Serial No. 855,996.

*To all whom it may concern:*

Be it known that I, JOSEPH F. JIROUSEK, a citizen of the United States of America, residing at Cleveland, in the county of Cuyahoga and State of Ohio, have invented certain new and useful Improvements in Cooling and Air-Circulating Means for Printing-Press Inking-Rolls, of which the following is a specification.

It is well known in the printers' art, that in order to properly ink the type or form in the chase, it is necessary to provide one or more rolls which are made of a soft substance or composition, which rolls travel back and forth and rotate with great rapidity, movement being imparted to the rolls by what are commonly called vibrator rolls which latter contact with the peripheries of the composition rolls and impart movement to the same by friction. The rolls are bunched or arranged in close proximity to each other, with the result that a series of nesting recesses or pockets are formed between the rolls, which recesses or pockets contain humid or dead air.

The rapid rotation of the rolls when the press is run at high speed, causes heating of the rolls to a high temperature, especially in warm weather, and when heated the rolls become soft and melt, often running down and over and covering the type form, in addition to the fact that the rolls are rendered totally unfit for further use. The use of stiff and tacky ink as is used on rough and cover papers increases the tendency of heating these rolls as the pull and friction affect the composition more readily than soft, thin ink. The melting of the composition rolls is further caused by the fact that air can not circulate around the entire peripheries of the rolls and thus drive out the dead air in the nesting recesses and pockets aforementioned. This dead or humid air causes the rollers to practically work in an atmosphere that has no life or resisting powers to heat, thereby causing the rollers to become soft and mushy and when rollers are in this condition same will not print satisfactory nor with an equal brilliancy or color, but cause the ink to look gray, broken and uneven forming a filled up and greasy cast. This is the biggest detriment in a printing plant in the summer or warm season of the year. The expense of upkeep in rollers is a big item under these conditions.

The primary object of the present invention is therefore to provide means of directing air currents along and around the peripheries of the composition rolls so that the current of air will drive out the dead air in the nesting recesses and pockets and especially where the latter occur between the bed, rollers and inking plate. The present device not only keeps the rolls in their original condition but cools the rolls to a certain extent, and also, circulates the air completely around the peripheries of the rolls so as to keep cool fresh air in close proximity to the rolls at all times throughout the operation of the latter.

A further object is to provide means for transmitting movement to the cooling and air circulating apparatus from the printing press and to provide for adjusting the power transmitting means with respect to the press.

These above and other objects are attained by the mechanism illustrated in the accompanying drawings, in which:

Figure 1 is a side elevation showing the application of the cooling mechanism to the composition rolls: Fig. 2 is a section taken on the line *c—c* of Fig. 1; Fig. 3 is a top plan view of the supporting bracket, partly in section, showing the friction drive wheel mounted thereon; and Fig. 4 is a section on the line A—A of Fig. 1.

In the drawings, the master gear wheel of an ordinary cylinder press is designated 1, and 2 the conventional guard, partly broken away which incloses the master gear wheel which imparts movement to the cylinder of the press. A bracket 3 has a hooked portion 4 which engages the guard 2 on one side and further has an L-shaped part 5 that contacts with the side 6 of the guard. A set screw 7 threadedly engages through an aperture formed in the L-shaped end 5 and bears upon the side 6 of the guard so as to thereby securely fasten the bracket to the guard.

From the foregoing it will be observed that the bracket can be adjusted up or down upon the guard and when placed in the desired position a lock nut 8 provided on the set screw 7 is tightened to prevent the set screw 7 from working loose.

An arm 9 provided with slots 10 is adjustably secured to the bracket 3 by bolts 11, the end 12 of the arm projecting beyond the hooked end 4 of the bracket 3, as depicted in Figs. 1 and 3. A stub shaft 13 is carried by arm 9 and is provided with an enlarged end 14 passing through an opening provided therefor in the end 12 of the arm and is held in place by a pin 15. Mounted upon the shaft 13 to rotate thereon is a sheave pulley 17 and a friction wheel 18, a washer 20 being interposed between the sheave pulley and friction wheel, and a second washer being placed on the shaft between the pulley and the end 12 of arm 9, the friction wheel and the sheave pulley being fastened together by any suitable means so that they will rotate in unison on the shaft 13.

Secured to the guard 2 and located below the bracket 3, is a yoke shaped bracket 21 provided with a hook shaped portion 22 and an L-shaped portion 23 which contacts with the part or side 6 of the guard, and is rigidly held in place by the set screw 24, the set screw being prevented from working loose by the lock nut 25. The bracket 21 has arms 26 and 27 provided with bearings 28 and 29 in which bearings a shaft 30 is journaled, the end 31 of the shaft 30 projecting for a distance beyond the arm 27.

The hub 32 of a fan having vanes 35 is rigidly attached to the shaft 30 by the set screw 33. Rigidly secured to the projecting end 31 of the shaft 30 is a sheave pulley 36 which rotates the shaft carrying the fan vanes 35 so as to circulate and direct a current of air lengthwise, underneath and around the peripheries of the composition rolls 37. The friction wheel 18 contacts with the side 38 of the master gear wheel 1, thereby imparting movement to the sheave pulley 17, and through the belt 39 to the sheave pulley 36.

It is particularly to be noted that the brackets 3 and 21 can be moved toward each other or away from each other and fastened upon the guard 2 at any point of their adjusted positions, thereby providing means of giving the proper or desired tension to the belt 39 in order to effectively transmit movement to the sheave pulley 36. The slots 10 in the arm 9 provide means of adjusting the friction wheel to and from the edge or side 38 of the gear 1 to increase or decrease the frictional contact between the wheel 18 and the gear 1.

It will be observed that by directing the air lengthwise along the composition rolls that the dead air in the pockets 40 and air between the bed plate 41 and the rolls 37 is continually agitated and stirred and maintained in motion so that the pockets 40 and nesting recesses between the composition rolls and bed and inking plate are thoroughly ventilated by fresh currents of air that are constantly kept circulating around the full and complete peripheries of the composition rolls. Attention is also called to the fact that by directing the current of air lengthwise of the rolls that fresh air is constantly brought in contact with the surface of the composition rolls at all points of its circumference equally, thereby keeping the rolls cool and preventing them from melting by reason of being overheated, due either to climate conditions or the heat generated by the vibrator rolls 42 which are used to impart reverse and direct movement to the composition rolls 37. Further by application of air lengthwise of the rolls the expense of renewing the rolls is saved and a large amount of labor obviated in changing them when overheated and a better quality of work is produced by the printing press.

What is claimed is:

1. In combination with a printing press having a frame and inking rolls which are arranged with a space between the frame and their ends adjacent said frame, a fan interposed between the frame and said roll ends and disposed in said space, means to connect the fan to the frame, and means to rotate the fan from a rotating part of the press.

2. In combination with a printing press having a frame and inking rolls which are arranged with a space between the frame and their ends adjacent said frame, a fan interposed between the frame and said roll ends and disposed in said space, means to adjustably connect the fan to said frame, means to drive the fan from a rotating part of the press, and means connecting the fan to the driving means.

3. In combination with a printing press having a frame and inking rolls which are arranged with a space between the frame and their ends adjacent said frame, a fan interposed between the frame and said roll ends and disposed in said space, means to rotate the fan, and means to adjustably mount the fan on the frame whereby the fan may be raised or lowered so as to regulate its sweep and bring the latter below the bottom roll to any desired extent.

4. In combination with the inking rolls of a printing press, a vertically adjustable fan arranged in close proximity to the inking rolls to force a current of air lengthwise of the rolls and completely around, over and under the peripheries thereof, a driving element engaged with a revolving part of the press so as to be rotated thereby, and a connection between the driving element and fan.

5. In combination with the inking rolls of a printing press, a fan arranged in close proximity to the inking rolls to force a current of air lengthwise of the rolls and completely around the peripheries thereof, a driving element engaged with a revolving part of the press so as to be rotated thereby, a belt connection between the fan and driving element, and means for vertically adjusting the fan whereby the relative distance between the fan and element may be adjusted so as to allow regulation of the tension on the belt connection and of the sweep of the fan to bring the latter below the bottom roll to any desired extent.

6. In combination with the inking rolls of a printing press, a pair of spaced independent brackets adjustably secured to the press, driving means on one of the brackets engageable with a moving part of the press to be rotated thereby, a fan arranged in close proximity to the inking rolls on the other bracket, and a belt connection between the fan and the driving means.

7. In combination with the inking rolls of a printing press, a bracket connected to a stationary part of the press, a driving disk frictionally engaged with a rotary part of the press, means adjustably connecting the bracket and disk whereby to allow the disk to be regulated in its engagement with the rotating part of the press, a fan, and means to drive the fan from the disk.

8. In combination with the inking rolls of a printing press, a bracket connected to a stationary part of the press, a driving disk frictionally engaged with a rotating part of the press, an arm rotatably supporting said driving disk, a pulley rotatable with the disk, means to adjustably connect the arm to the bracket so as to allow the disk to be regulated in its engagement with the rotating part of the press, a fan, a bracket adjustably connected to the press and supporting the fan, and a belt connection between the fan and the pulley.

In testimony whereof I affix my signature in presence of two witnesses.

JOSEPH F. JIROUSEK.

Witnesses:
    A. J. SCHENKELBERG,
    SARAH E. JONES.